(12) United States Patent
Gress et al.

(10) Patent No.: US 7,024,209 B1
(45) Date of Patent: Apr. 4, 2006

(54) UNIFIED MESSAGING SYSTEM CONFIGURED FOR MANAGEMENT OF SHORT MESSAGE SERVICE-TYPE MESSAGES

(75) Inventors: David Stephen Gress, Mechanicsville, VA (US); Robert Raymond Sealey, Brighton (AU); Robert James Lockwood, Richmond, VA (US)

(73) Assignee: Cisco Technology, Inc., San Jose, CA (US)

(*) Notice: Subject to any disclaimer, the term of this patent is extended or adjusted under 35 U.S.C. 154(b) by 765 days.

(21) Appl. No.: 09/739,687

(22) Filed: Dec. 20, 2000

(51) Int. Cl.
*H04Q 7/20* (2006.01)
*H04M 1/00* (2006.01)
*H04L 12/28* (2006.01)
*H04J 3/24* (2006.01)
*G06F 15/16* (2006.01)

(52) U.S. Cl. .............. 455/466; 455/422.1; 455/432.2; 455/432.3; 455/550.1; 455/560; 370/349; 370/395.5; 709/203; 709/218; 709/219

(58) Field of Classification Search ............ 455/412.1, 455/412.2, 413, 414.1–414.4, 418, 432.2–432.3, 455/466, 422.1, 433, 439, 554.1, 554.2, 550.1, 455/560, 426.1, 426.2; 370/349, 395.5; 709/203, 709/216, 218–219, 229

See application file for complete search history.

(56) References Cited

U.S. PATENT DOCUMENTS 4,837,798 A 6/1989 Cohen et al.

(Continued)

FOREIGN PATENT DOCUMENTS

WO  WO 01/03011 A2 * 1/2001

OTHER PUBLICATIONS

Crispin, "Internet Message Access Protocol—Version 4rev1", Request for Comments: 2060, Network Working Group, Dec. 1996.

(Continued)

*Primary Examiner*—William Trost
*Assistant Examiner*—Meless Zewdu
(74) *Attorney, Agent, or Firm*—Leon R. Turkevich

(57) ABSTRACT

A unified communications system is configured for receiving, storing, and/or sending SMS messages based on management of the SMS messages according to a prescribed open standards-based protocol. The unified communications system includes an SMS module configured for receiving SMS messages according to SMPP protocol. The SMS module obtains source and destination information from the received SMS message, and accesses a subscriber profile directory for subscriber profile information based on at least one of the source and destination information. The SMS module generates a common format message that includes the SMS message, and selectively supplies the common format message to selected destinations based on the accessed subscriber profile information. The common format message may be stored in a prescribed message store, for example an IMAP directory, or output as an e-mail message to a prescribed destination. The SMS module also is configured for selectively supplying stored messages to a unified messaging subscriber as an SMS message based on the profile information on the unified messaging subscriber. Hence, the unified communications system enables SMS messaging users to send SMS messages to non SMS-type devices (e.g., telephones, e-mail clients, etc.) and retrieve stored common format messages (e.g., fax, e-mail, voice messages) using the SMS message system.

61 Claims, 3 Drawing Sheets

U.S. PATENT DOCUMENTS

| | | | | |
|---|---|---|---|---|
| 5,802,314 | A | * | 9/1998 | Tullis et al. ........... 395/200.76 |
| 5,991,806 | A | * | 11/1999 | McHann, Jr. ............... 709/224 |
| 6,108,559 | A | * | 8/2000 | Astrom et al. .............. 455/466 |
| 6,185,288 | B1 | * | 2/2001 | Wong ......................... 379/219 |
| 6,263,212 | B1 | * | 7/2001 | Ross et al. .................. 455/466 |
| 6,343,287 | B1 | * | 1/2002 | Kumar et al. ................... 707/4 |
| 6,412,079 | B1 | * | 6/2002 | Edmonds et al. ............. 714/11 |
| 6,470,332 | B1 | * | 10/2002 | Weschler ........................ 707/3 |
| 6,487,594 | B1 | * | 11/2002 | Bahlmann ................... 709/225 |
| 6,507,817 | B1 | * | 1/2003 | Wolfe et al. ................ 704/260 |
| 6,625,274 | B1 | * | 9/2003 | Hoffpauir et al. ........... 379/229 |
| 6,625,460 | B1 | * | 9/2003 | Patil ........................... 455/466 |
| 6,640,097 | B1 | | 10/2003 | Corrigan et al. |
| 6,671,355 | B1 | * | 12/2003 | Spielman et al. ........ 379/88.12 |
| 2001/0003203 | A1 | * | 6/2001 | Mache ........................ 713/201 |

OTHER PUBLICATIONS

Wahl et al., "Lightweight Directory Access Protocol (v3)", Request for Comments: 2251, Network Working Group, Dec. 1997.

Wahl et al., "Lightweight Directory Access Protocol (v3): Attribute Syntax Definitions", Request for Comments: 2252, Network Working Group, Dec. 1997.

Wahl et al., "Lightweight Directory Access Protocol (v3): UTF-8 String Representation of Distinguished Names", Request for Comments: 2253, Network Working Group, Dec. 1997.

Howes, "The String Representation of LDAP Search Filters", Request for Comments: 2254, Network Networking Group, Dec. 1997.

Howes, "The LDAP URL Format", Request for Comments: 2255, Network Working Group, Dec. 1997.

Wahl, "A Summary of the X.500(96) User Scheme for use with LDAPv3", Request for Comments: 2256, Network Working Group, Dec. 1997.

Wahl et al., :Authentication Methods for LDAP, Request for Comments: 2829, Network Working Group, May 2000.

Hodges et al, "Lightweight Directory Access Protocol (v3): Extension for Transport Layer Security", Request for Comments: 2830, Network Working Group, May 2000.

"Short Message Peer to Peer Protocol Specification v3.4", SMS Forum (formerly SMPP Developers Forum), http://www.smpp.org, Oct. 12, 1999 Issue 1.2.

* cited by examiner

UNIFIED MESSAGING SYSTEM CONFIGURED FOR MANAGEMENT OF SHORT MESSAGE SERVICE-TYPE MESSAGES

BACKGROUND OF THE INVENTION

1. Field of the Invention

The present invention relates to unified messaging systems configured for receiving, storing, and supplying messages to a subscriber, independent of message format or the type of device used by the sender of the message or the subscriber accessing the messages.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

Short Message Services (SMS) have been implemented in wireless telephone communications systems as a way to send a message to a subscriber's wireless phone. SMS messages have become quite popular recently, due in part from wireless telephone service providers offering SMS as a free service in conjunction with wireless telephony services; hence, many wireless subscribers have developed a preference to communicating using SMS as opposed to more costly wireless voice services. A messaging server, also referred to as a Short Message Service Center (SMSC), is configured for receiving an SMS message from a messaging source according to Short Message Peer to Peer Protocol (SMPP). The messaging source may be, for example, a cellphone supplying a user-input message, or an e-mail interface resident within the wireless telephone communications system. The SMSC, in response to receiving the SMS message from the messaging source, transmits a short message to the cellular phone based on the destination telephone number specified within the notification message. However, this arrangement still provides only limited flexibility in enabling different sources to send an SMS message to a cellular phone. In addition, existing cellphones are limited by memory to storing up to ten SMS messages. Moreover, this arrangement limits the ability of an SMS subscriber having a cellphone to send messages to a destination that does not have an SMS-capable cellphone.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems enables service providers to use scalable and distributed systems using recognized communication protocols. Hence, the service providers may use such unified communications systems across multiple platforms, independent of protocol, for storage of various types of messages, for example voice messages, facsimile, and e-mail stored in a centralized messaging store. However, existing unified communications systems still have not address the need for integrating SMS messaging within the unified messaging scheme; hence, unified messaging subscribers have not been able to fully utilize the beneficial features of sending and receiving SMS messages.

SUMMARY OF THE INVENTION

There is a need for an arrangement that enables open standards-based unified messaging systems to receive, store, and/or send unified messages for a SMS messaging subscriber.

There also is a need for an arrangement that enables an open standards-based unified messaging system to store SMS messages for a unified messaging subscriber for retrieval by a user access device independent of device protocol.

There also is a need for an arrangement that enables an SMS subscriber to send an SMS message to multiple destinations based on a prescribed distribution list.

There also is a need for an arrangement that enables a unified messaging subscriber to retrieve stored messages based on transfer of the stored messages to the unified messaging subscriber according to SMS message protocol.

These and other needs are attained by the present invention, where a unified communications system is configured for receiving, storing, and/or sending SMS messages based on management of the SMS messages according to a prescribed open standards-based protocol. The unified communications system includes an SMS module configured for receiving SMS messages according to SMPP protocol. The SMS module obtains source and destination information from the received SMS message, and accesses a subscriber profile directory for subscriber profile information based on at least one of the source and destination information. The SMS module generates a common format message that includes the SMS message, and selectively supplies the common format message to selected destinations based on the accessed subscriber profile information. The common format message may be stored in a prescribed message store, for example an IMAP directory, or output as an e-mail message to a prescribed destination. The SMS module also is configured for selectively supplying stored messages to a unified messaging subscriber as an SMS message based on the profile information on the unified messaging subscriber. Hence, the unified communications system enables SMS messaging users to send SMS messages to non SMS-type devices (e.g., telephones, e-mail clients, etc.) and retrieve stored common format messages (e.g., fax, e-mail, voice messages) using the SMS message system.

One aspect of the present invention provides a method in a server. The method includes receiving a short message service (SMS) message according to short message peer-to-peer (SMPP) protocol. The method also includes accessing a subscriber directory, according to an open network protocol, for subscriber attribute information based on the received SMS message. The server generates, based on the subscriber attribute information, at least one common format message that includes the SMS message, and supplies the common format message to a selected destination according to a selected access protocol based on the subscriber attribute information. The generation of a common format message that includes the SMS message enables storage of the SMS message in unified message stores configured for storing unified messages for subscribers, for example according to IMAP protocol. Moreover, the generation of a common format message enables the SMS message to be sent to a destination according to any subscriber-selected protocol, for example as an e-mail message, a fax message, a voice message using text to speech resources, etc.

Another aspect of the present invention provides a server comprising a short message service (SMS) module, a first interface resource, and a second interface resource. The SMS module is configured for receiving SMS messages according to short message peer to peer (SMPP) protocol, and also is configured for generating a query for subscriber attribute information based on the received SMS message, and generating at least one common format message based on the subscriber attribute information and that includes the SMS message. The first interface resource is configured for accessing the subscriber attribute information based on the query from a subscriber directory according to a prescribed open network protocol, and the second interface resource is configured for outputting the at least one common format message according to at least one of SMTP protocol and IMAP protocol.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
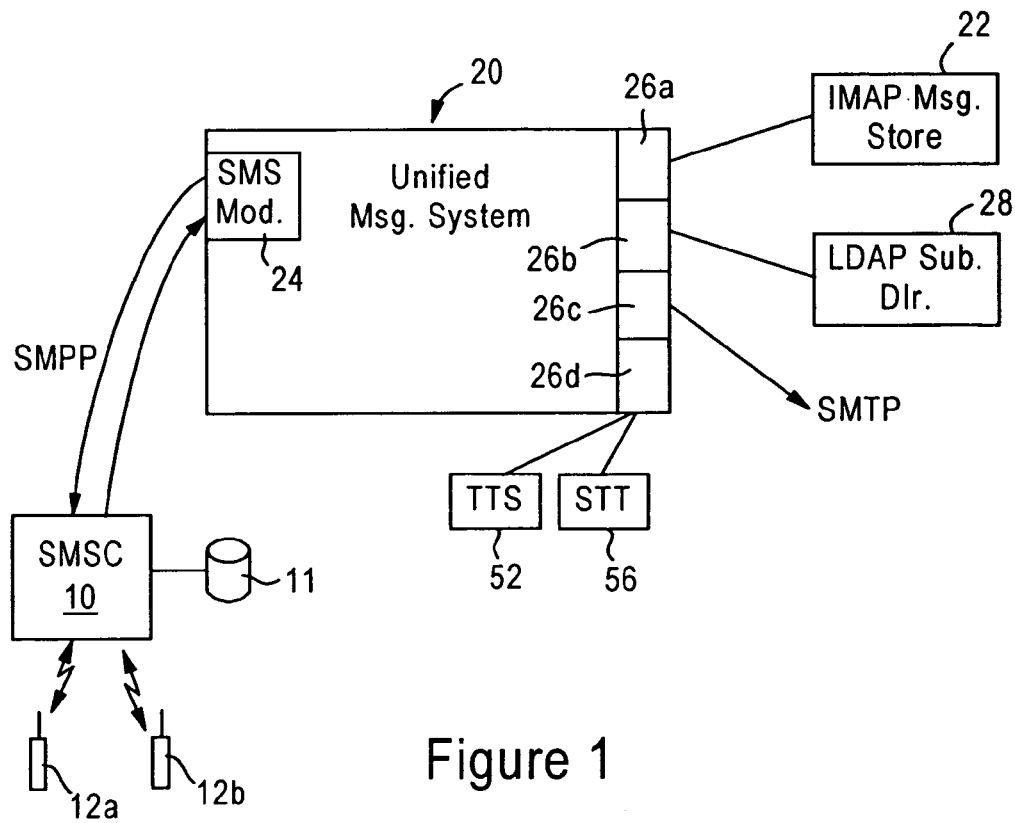
FIG. 1 is a block diagram illustrating a unified messaging system configured for sending and receiving SMS messages for storage in a unified message store according to an embodiment of the present invention.

FIG. 1 is a block diagram illustrating an architecture that provides unified messaging services via an IP network according to an embodiment of the present invention. The architecture includes an SMSC 10 configured for sending and receiving SMS messages to wireless SMS devices 12, and for selectively forwarding SMS messages to peer systems via SMPP protocol. The architecture also includes a unified messaging system 20 configured for receipt, storage, and retrieval of messages stored in a subscriber message store 22, independent of the message type. An exemplary implementation of the unified messaging system 20 is the commercially available Cisco Unified Open Network Exchange (Cisco uOne) (Products UONE-FOUND 4.1S, and UONE-VOICEMSG4.1S) from Cisco Systems, Inc.

The inventors have realized that SMS messages can be managed as true message types that can be received, stored, and retrieved from the unified messaging system 20. In particular, the disclosed embodiment contemplates enhancing the existing Cisco uOne system by addition within the unified messaging system 20 of an SMS module 24 configured for sending and receiving SMS messages via SMPP protocol.

In addition, the SMS module 24 is configured for accessing standardized application programming interfaces (APIs) 26 executable within the unified messaging system 20. Hence, the SMS module 24 is able to access an LDAP API 26b for subscriber profile information from a subscriber directory 28 according to LDAP protocol: such subscriber profile information may include subscriber notification preferences, as well as distribution lists established by the subscribers. Hence, the SMS module 24 can generate multiple SMS messages for respective destinations based on reception of an SMS message that specifies a subscriber distribution list. In addition, the SMS module 24 is able to access the IMAP message store 22 via an IMAP API 26a for storage of SMS messages in a common format recognizable by the IMAP message store 22, enabling the SMS message to the stored and retrieved as part of the unified messages managed by the unified messaging system 20.

Figure 2:
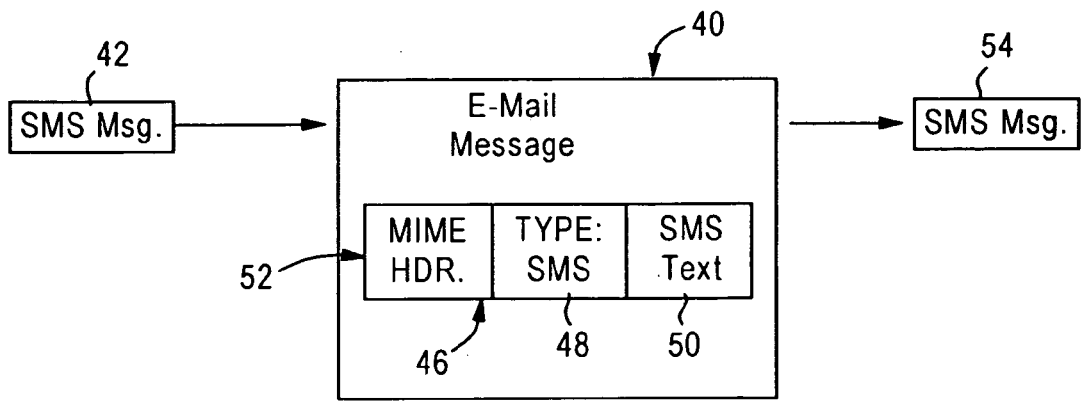
FIG. 2 is a diagram illustrating the generation of a common format message used for storage of a received SMS message in the unified message store of FIG. 1 according to an embodiment of the present invention.

FIG. 2 is a diagram illustrating the generation of a common format message 40 (e.g., an e-mail message) from a received SMS message 42 by the SMS module 24. The SMS module 24 is configured for generating an e-mail message by enclosing the SMS message 42 (typically composed of unicode text) within the body 50 of a Multipurpose Internet Mail Extension (MIME) wrapper 52. In particular, the MIME wrapper 52 includes a MIME header 46 having a type field 48 that specifies the message type within the body 50.

The SMS module 24 is configured for inserting the SMS message 42 into the body 50, and specifying within the type field 48 a designation that identifies the unicode text within the body 50 as an SMS message type. The MIME wrapper 52 is then attached to a common format, e-mail message 40 having source and destination address fields selected based on subscriber profile information within the LDAP directory 28 accessed by the SMS module 24. For example, the e-mail message 40 may be output by the SMS module 24 for storage in the IMAP message store 22, either in the sending party's "sent" folder, or within at least one destination party's "inbox" folder, and possibly within a subdirectory for SMS messages. Alternatively, the e-mail message 40 may be output via an SMTP API 26c according to SMTP protocol to another remote messaging server (e.g., another unified messaging system 20), enabling the SMS message to be sent to a destination SMSC in a manner that bypasses existing SMPP links.

Hence, the generation of the common format message 40 for storage of the SMS message 42 in an IMAP message store 22 enables the unified messaging system 20 to receive and send SMS messages, as needed. Hence, the SMS module 24 enables the SMS messages 42 to be handled as any other unified message, such as a voice message, an e-mail message, a fax, etc. For example, text to speech (TTS) services 52 can be used by the SMS module 24 to convert the unicode text within the SMS message 42 into a stored voice message for a subscriber.

In addition, the SMS module 24 can generate a new SMS message based on retrieval of a unified message from the IMAP message store 22 of a selected subscriber. For example, stored voice messages can be converted to unicode text format for generation of a new SMS message 54 using available speech to text (STT) resources 56. Alternatively, the new SMS message 54 may be generated based on recovery of the unicode text obtained from another SMS message 42 received by the SMS module 24.

The SMS module 24 may also generate the SMS message 54 as part of a notification service for a subscriber, enabling a subscriber to obtain a daily status of stored messages within the IMAP message store 22, illustrated in further detail below. Hence, the SMS module 24 provides two-way conversion for SMS messages, where a received SMS message 42 is stored in a common format e-mail message 40, and where a common format e-mail message having a stored message in a prescribed format (e.g., voice) is converted to unicode text for generation of a new SMS message 54 to be supplied to the subscriber.

Figure 3A:
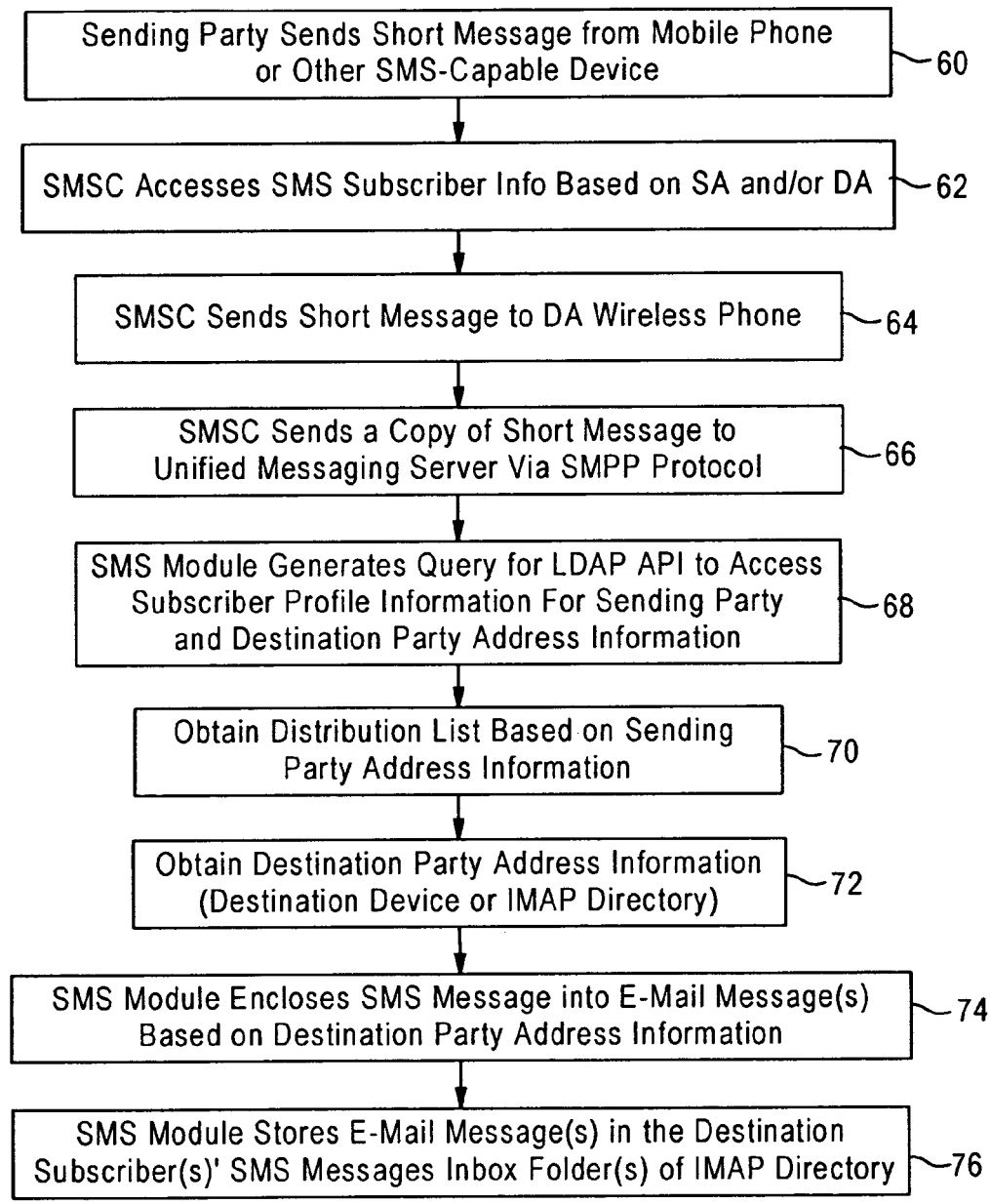
FIGS. 3A, 3B, and 3C are diagrams summarizing the method of processing SMS messages by the unified messaging server of FIG. 1 according to an embodiment of the present invention.
Figure 3B:
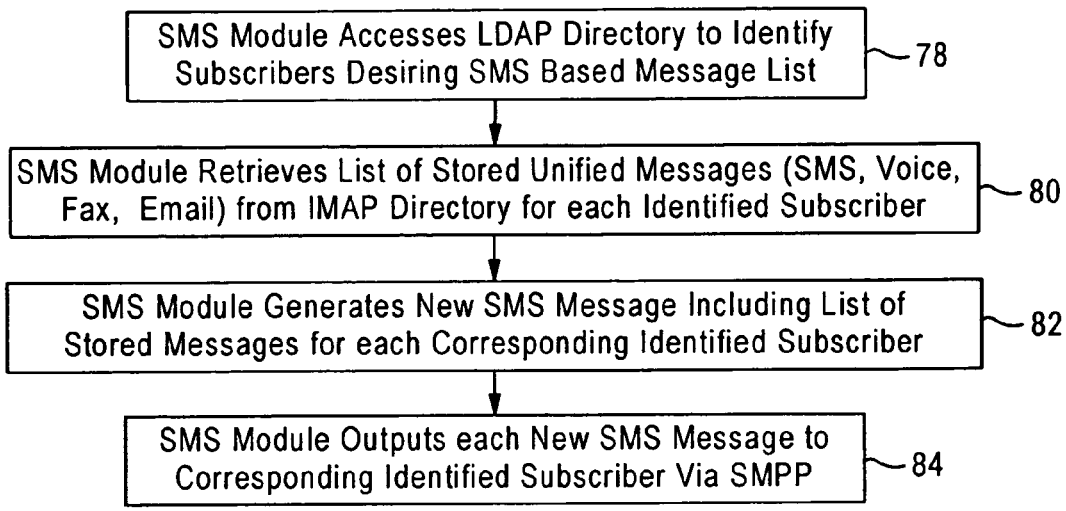
Figure 3C:
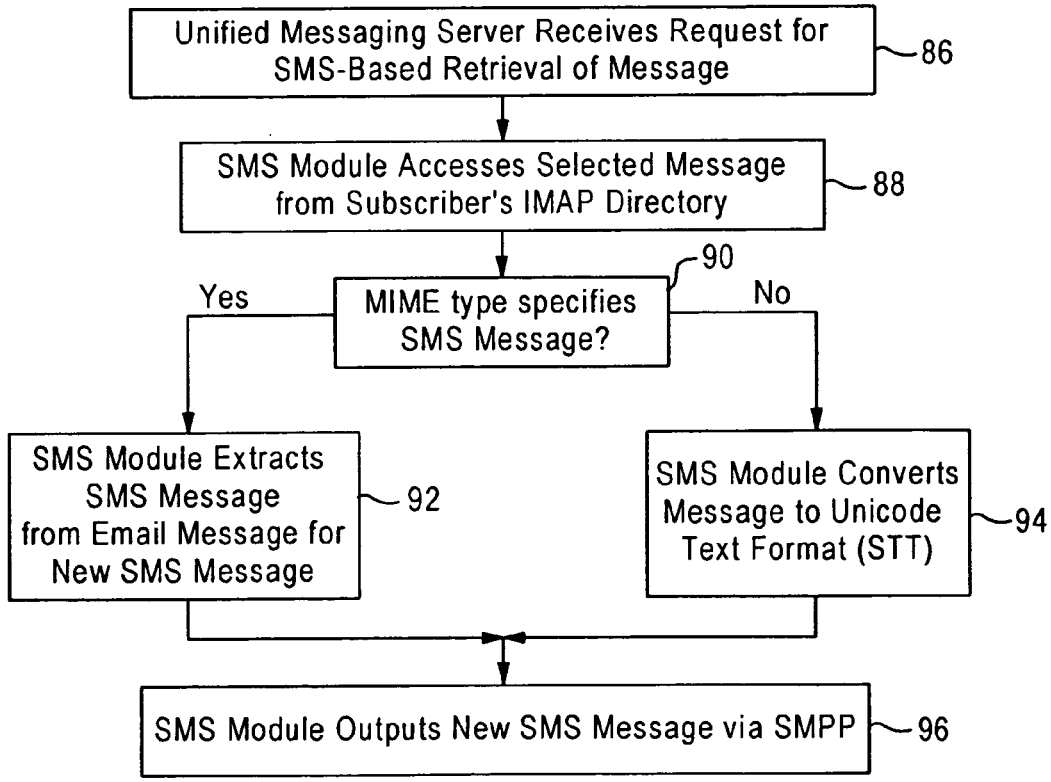

FIGS. 3A, 3B, and 3C are diagrams summarizing SMS operations performed by the SMS module 24, including storing a received SMS message according to a prescribed distribution list, generating an SMS message including a list of stored messages for an identified subscriber, and supplying a stored message to a subscriber using an SMS message, respectively. The steps described in FIGS. 3A, 3B, and 3C can be implemented as executable code stored on a computer readable medium (e.g., a hard disk drive, a floppy drive, a random access memory, a read only memory, an EPROM, a compact disc, etc.).

The method of FIG. 3A begins in step 60, where a sending party using a mobile phone or other SMS capable device (e.g., a wireless personal digital assistant) 12 sends a short message to the SMSC 10. The SMSC 10 accesses SMS subscriber information in step 62 from an SMS subscriber directory 11 based on the source address (SA) or destination address (DA) specified within the SMS message. If neither source address nor destination address specify auto forwarding to the unified messaging system 20, the SMSC sends the short message in step 64 to the wireless device specified by the destination address; however if the SMS subscriber information in the SMS subscriber directory 11 specifies that either the source address or destination address wants a copy of the SMS message forwarded to the unified messaging system 20, the SMSC 10 also sends a copy of the short message in step 66 to the unified messaging server 20 via SMPP protocol.

The SMS module 24, upon receiving the SMS message 42 via SMPP protocol, generates a query in step 68 for subscriber profile information from the subscriber registry 28 using the LDAP API 26b. The SMS module 24 obtains any distribution list based on the sending party address information in step 70, and obtains destination party address information in step 72, specifying the preferred destination device (e.g., Web client, telephone, wireless PDA, cellphone, etc.) or IMAP directory location. The SMS module 24 encloses in step 74 the received SMS message 42 into a common format message such as an e-mail message 40, as illustrated in FIG. 2, specifying a destination address based on the destination party address information. The SMS module 24 then stores in step 76 the e-mail messages 40 in the appropriate destination subscriber inbox folders of the IMAP directory 22.

Hence, the received SMS message 42, upon specifying a prescribed distribution list in its destination field, enables the SMS module 24 to generate multiple e-mail messages for respective destination subscribers having respective messaging folders in the IMAP directory 22.

FIG. 3B is a diagram illustrating another example of the use of the SMS module 24 in generating a new SMS message 54 for an SMS subscriber that prefers a periodic SMS message specifying the list of stored messages within the subscriber's IMAP directory 22. The method begins in step 78, where the SMS module 24 accesses the LDAP directory 28 to identify subscribers desiring an SMS based message list. The SMS module 24 retrieves in step 80 a list of stored unified messages (e.g., SMS messages, voice messages, fax messages, e-mail messages) for each identified subscriber desiring SMS notification. The SMS module 24 then generates the new SMS message 54 in step 82, which includes the list of stored messages for the corresponding identified subscriber, and outputs the new SMS message 54 in step 84 for delivery to the identified subscriber via SMPP protocol.

Hence, the SMS module 24 can be used to generate a new SMS message 54 that provides a message list to be sent to a unified messaging subscriber. The unified messaging subscriber, upon receipt of the SMS message 54 on his for her SMS enabled device, can then select messages specified within the SMS message for retrieval or deletion.

FIG. 3C is a diagram illustrating the SMS module 24 retrieving unified messages from the IMAP message store 22, and forwarding the retrieved messages to the messaging subscriber in an SMS message. The method begins in step 86, where the unified messaging server 20 receives the request for an SMS based retrieval of a selected message. The request may be received in the form of another SMS message, or alternately as any other type of unified request recognized during a messaging session with the subscriber (e.g., web based messaging session, voice based messaging session, etc.).

The SMS module 24 accesses the selected message from the subscriber's IMAP directory 22 in step 88, and determines in step 90 whether the MIME type 48 specifies that the body 50 includes an SMS message. If the MIME type 48 specifies an SMS message type, the SMS module 24 extracts in step 92 the SMS message from the body 50 of the MIME wrapper 46 attached to the e-mail message 40 for generation of the new SMS message 54. However if in step 90 the MIME type specifies another type of message, the SMS module 24 converts in step 94 the message to unicode text format, for example using speech to text (STT) resources 56. The SMS module 24 outputs the new SMS message 54 in step 96 via SMPP for delivery to the subscriber's SMS enabled device.

According to the disclosed embodiment, a unified messaging system includes an SMS module that enables the unified messaging system to receive and store SMS messages as unified messages in a standardized message store. Moreover, the unified messaging system can generate SMS messages, based on subscriber preferences, enabling users to receive any type of stored message (e.g., voice, fax, e-mail, etc.) using an SMS enabled device.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a unified messaging server, the method comprising:

receiving a short message service (SMS) message by the unified messaging server according to short message peer-to-peer (SMPP) protocol;

accessing by the unified messaging server a subscriber directory, according to an open network protocol, for subscriber attribute information based on the received SMS message;

generating, based on the subscriber attribute information, at least one common format message based on enclosing the SMS message into the common format message by the unified messaging server;

supplying the common format message by the unified messaging server to a selected destination according to a selected access protocol based on the subscriber attribute information;

second generating a new SMS message including subscriber messaging information for a selected subscriber; and outputting the new SMS message for the selected subscriber according to SMPP protocol;

wherein the second generating step includes:

retrieving the common format message as the subscriber messaging information from a subscriber message store having a directory for the selected subscriber; and inserting the received SMS message, extracted from the retrieved common format message, into the new SMS message.

2. The method of claim 1, wherein the supplying step includes storing the common format message in the subscriber message store, the selected destination corresponding to a messaging folder for a selected subscriber.

3. The method of claim 2, wherein the supplying step further includes storing the common format message as an e-mail message according to Internet Message Access Protocol (IMAP).

4. The method of claim 2, wherein the generating step includes generating within the at least one common format message a destination address based on the subscriber attribute information.

5. The method of claim 4, wherein the subscriber attribute information specifies at least one of a distribution list specified by an identified source of the SMS message, and a destination preference specified by an identified destination of the SMS message.

6. The method of claim 5, wherein the accessing step includes accessing the subscriber directory according to Lightweight Directory Access Protocol (LDAP) as the open network protocol for the subscriber attribute information.

7. The method of claim 1, wherein the supplying step includes outputting the common format message to the selected destination according to SMTP protocol.

8. The method of claim 1, wherein the generating step includes enclosing the SMS message within a body of a MIME data structure, and specifying within the MIME data structure that the body has an SMS type.

9. The method of claim 1, wherein the second generating step includes obtaining subscriber messaging information, specifying stored unified messages within an assigned directory for the selected subscriber, from the subscriber message store according to a prescribed open network protocol.

10. The method of claim 9, wherein the subscriber messaging information specifies at least one of a stored SMS message, a voice message, a fax message, and an e-mail message, as a corresponding at least one of the stored unified messages.

11. The method of claim 9, wherein the obtaining step includes obtaining the subscriber messaging information from the subscriber message store according to IMAP protocol.

12. The method of claim 1, wherein the second generating step generates the new SMS message for the selected subscriber based on the corresponding subscriber attribute information for the selected subscriber.

13. A method in a communications system, the method comprising:

receiving by a short message service center (SMSC) an SMS message from a SMS device;

forwarding a copy of the SMS message to a unified messaging server via short message peer-to-peer (SMPP) protocol based on SMS subscriber information determined by the SMSC based on the SMS message;

accessing subscriber attribute information by the unified messaging server based on the SMS message;

enclosing the SMS message by the unified messaging server into a common format message; and supplying the common format message to at least one selected destination based on the subscriber attribute information.

14. The method of claim 13, wherein the forwarding step includes:

accessing the SMS subscriber information based on at least one of the SMS source address and the SMS destination address; and generating the copy for forwarding to the unified messaging server based on accessing the SMS subscriber information for at least one of the SMS source address and the SMS destination address.

15. The method of claim 14, further comprising sending the SMS message to a second SMS device, having a prescribed address matching a destination address within the SMS message, according to a prescribed wireless protocol.

16. The method of claim 13, wherein the supplying step includes storing the common format message in a subscriber message store, the at least one selected destination corresponding to a messaging folder for a selected subscriber.

17. The method of claim 16, wherein the supplying step further includes storing the common format message as an e-mail message according to IMAP protocol.

18. The method of claim 16, wherein the enclosing step includes generating for the common format message a destination address based on the subscriber attribute information.

19. The method of claim 18, further comprising generating a plurality of the common format messages having respective selected destinations based on retrieval of a distribution list from the subscriber attribute information.

20. The method of claim 19, wherein the accessing step includes accessing the subscriber attribute information according to Lightweight Directory Access Protocol (LDAP).

21. The method of claim 13, wherein the supplying step includes outputting the common format message to the selected destination according to at least one of SMTP protocol and IMAP protocol.

22. The method of claim 13, wherein the enclosing step includes enclosing the SMS message within a body of a MIME data structure, and specifying within the MIME data structure that the body has an SMS type.

23. The method of claim 13, further comprising:
generating by the unified messaging server a new SMS message including subscriber messaging information for a selected subscriber; and
outputting the new SMS message to the SMS the via SMPP protocol.

24. The method of claim 23, wherein the generating step includes obtaining subscriber messaging information, specifying stored unified messages within an assigned directory for the selected subscriber, from a subscriber message store according to a prescribed open network protocol.

25. The method of claim 24, wherein the subscriber messaging information specifies at least one of a stored SMS message, a voice message, a fax message, and an e-mail message, as a corresponding at least one of the stored unified messages.

26. The method of claim 24, wherein the obtaining step includes obtaining the subscriber messaging information from the subscriber message store according to IMAP protocol.

27. The method of claim 23, wherein the generating step includes:
retrieving the common format message as the subscriber messaging information from a message store having a directory for the selected subscriber; and
inserting the received SMS message, extracted from the retrieved common format message, into the new SMS message.

28. The method of claim 23, wherein the generating step generates the new SMS message for the selected subscriber based on the corresponding subscriber attribute information for the selected subscriber.

29. The method of claim 28, wherein the inserting step includes converting the voice message into a text-based message, and inserting the text-based message into the new SMS message.

30. The method of claim 23, wherein the generating step includes:
retrieving from a subscriber message store at least one of the stored SMS message, a voice message, a fax message, and an e-mail message from a directory assigned for the selected subscriber; and
inserting the at least one message into the new SMS message.

31. The method of claim 13, wherein the accessing step includes accessing a subscriber directory according to an open network protocol for the subscriber attribute information.

32. The method of claim 31, wherein the step of accessing the subscriber directory includes generating a query according to LDAP protocol.

33. A unified messaging server comprising:
a short message service (SMS) module configured for receiving SMS messages according to short message peer to peer (SMPP) protocol, the SMS module configured for generating a query for subscriber attribute information based on the received SMS message, and generating at least one common format message based on the subscriber attribute information and based on enclosing the SMS message into the at least one common format message;
a first interface resource configured for accessing the subscriber attribute information based on the query from a subscriber directory according to a prescribed open network protocol, the first interface resource configured for accessing the subscriber attribute information from the subscriber directory according to LDAP protocol; and
a second interface resource configured for outputting the at least one common format message according to at least one of SMTP protocol and IMAP protocol;
wherein the SMS module is configured for generating a first common format message for storage according to IMAP protocol of the SMS message in a sent directory for a first subscriber having sent the SMS message, and a second common format message for storage of the SMS message according to IMAP protocol in a new message directory for a second subscriber identified as a recipient for the SMS message.

34. The server of claim 33, wherein the SMS module is configured for generating a plurality of common format messages for respective destinations based on retrieval from the subscriber attribute information of a distribution list specified by the SMS message.

35. The server of claim 33, wherein the SMS module is configured for enclosing the SMS message within a body of a MIME data structure, and specifying within the MIME data structure that the body has an SMS type.

36. The server of claim 33, wherein the SMS module is configured for generating a new SMS message including subscriber messaging information for a selected subscriber, the SMS module outputting the new SMS message for the selected subscriber according to SMPP protocol.

37. The server of claim 36, wherein the SMS module obtains the subscriber messaging information from a subscriber message store according to IMAP protocol based on the subscriber attribute information for the corresponding selected subscriber accessed by the first interface from the subscriber directory.

38. A computer readable medium having stored thereon sequences of instructions for receiving a short message service (SMS) message by a unified messaging server, the sequences of instructions including instructions for performing the steps of:
receiving a short message service (SMS) message by the unified messaging server according to short message peer-to-peer (SMPP) protocol;
accessing by the unified messaging server a subscriber directory, according to an open network protocol, for subscriber attribute information based on the received SMS message;
generating, based on the subscriber attribute information, at least one common format message based on enclosing the SMS message into the common format message by the unified messaging server;
supplying the common format message by the unified messaging server to a selected destination according to a selected access protocol based on the subscriber attribute information;
second generating a new SMS message including subscriber messaging information for a selected subscriber; and
outputting the new SMS message for the selected subscriber according to SMPP protocol;
wherein the second generating step includes:
retrieving the common format message as the subscriber messaging information from a subscriber message store having a directory for the selected subscriber; and
inserting the received SMS message, extracted from the retrieved common format message, into the new SMS message.

39. The medium of claim 38, wherein the supplying step includes storing the common format message in the subscriber message store, the selected destination corresponding to a messaging folder for a selected subscriber.

40. The medium of claim 39, wherein the supplying step further includes storing the common format message as an e-mail message according to Internet Message Access Protocol (IMAP).

41. The medium of claim 39, wherein the generating step includes generating within the at least one common format message a destination address based on the subscriber attribute information.

42. The medium of claim 41, wherein the subscriber attribute information specifies at least one of a distribution list specified by an identified source of the SMS message, and a destination preference specified by an identified destination of the SMS message.

43. The medium of claim 42, wherein the accessing step includes accessing the subscriber directory according to Lightweight Directory Access Protocol (LDAP) as the open network protocol for the subscriber attribute, information.

44. The medium of claim 38, wherein the supplying step includes outputting the common format message to the selected destination according to SMTP protocol.

45. The medium of claim 38, wherein the generating step includes enclosing the SMS message within a body of a MIME data structure, and specifying within the MIME data structure that the body has an SMS type.

46. The medium of claim 38, wherein the second generating step includes obtaining subscriber messaging information, specifying stored unified messages within an assigned directory for the selected subscriber, from a subscriber message store according to a prescribed open network protocol.

47. The medium of claim 46, wherein the subscriber messaging information specifies at least one of a stored SMS message, a voice message, a fax message, and an e-mail message, as a corresponding at least one of the stored unified messages.

48. The medium of claim 46, wherein the obtaining step includes obtaining the subscriber messaging information from the subscriber message store according to IMAP protocol.

49. The medium of claim 38, wherein the second generating step generates the new SMS message for the selected subscriber based on the corresponding subscriber attribute information for the selected subscriber.

50. A unified messaging server comprising:
means for receiving a short message service (SMS) message according to short message peer-to-peer (SMPP) protocol;
means for accessing a subscriber directory, according to an open network protocol, for subscriber attribute information based on the received SMS message;
means for generating, based on the subscriber attribute information, at least one common format message based on enclosing the SMS message into the common format message;
means for supplying the common format message to a selected destination according to a selected access protocol based on the subscriber attribute information;
means for generating a new SMS message including subscriber messaging information for a selected subscriber; and
means for outputting the new SMS message for the selected subscriber according to SMPP protocol;
wherein the means for generating the new SMS message is configured for retrieving the common format message as the subscriber messaging information from a message store having a directory for the selected subscriber, and inserting the received SMS message, extracted from the retrieved common format message, into the new SMS message.

51. The server of claim 50, wherein the supplying means is configured for storing the common format message in the subscriber message store, the selected destination corresponding to a messaging folder for a selected subscriber.

52. The server of claim 51, wherein the supplying means is configured for storing the common format message as an e-mail message according to Internet Message Access Protocol (IMAP).

53. The server of claim 51, wherein the generating means is configured for generating within the at least one common format message a destination address based on the subscriber attribute information.

54. The server of claim 53, wherein the subscriber attribute information specifies at least one of a distribution list specified by an identified source of the SMS message, and a destination preference specified by an identified destination of the SMS message.

55. The server of claim 54, wherein the accessing means is configured for accessing the subscriber directory according to Lightweight Directory Access Protocol (LDAP) as the open network protocol for the subscriber attribute information.

56. The server of claim 50, wherein the supplying means is configured for outputting the common format message to the selected destination according to SMTP protocol.

57. The server of claim 50, wherein the generating means includes means for enclosing the SMS message within a body of a MIME data structure, and specifying within the MIME data structure that the body has an SMS type.

58. The server of claim 50, wherein the means for generating a new SMS message is configured for obtaining subscriber messaging information, specifying stored unified messages within an assigned directory for the selected subscriber, from a subscriber message store according to a prescribed open network protocol.

59. The server of claim 58, wherein the subscriber messaging information specifies at least one of a stored SMS message, a voice message, a fax message, and an e-mail message, as a corresponding at least one of the stored unified messages.

60. The server of claim 58, wherein the means for generating a new SMS message is configured for obtaining the subscriber messaging information from the subscriber message store according to IMAP protocol.

61. The server of claim 50, wherein the means for generating the new SMS message is configured for generating the new SMS message for the selected subscriber based on the corresponding subscriber attribute information for the selected subscriber.

* * * * *